(12) United States Patent
Brown (10) Patent No.: US 9,638,260 B2
(45) Date of Patent: May 2, 2017

(54) WHEEL SPINDLE DRIVE ELEMENT

(71) Applicant: Schaeffler Technologies AG & Co. KG, Herzogenaurach (DE)

(72) Inventor: Mark Brown, Lakewood, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 108 days.

(21) Appl. No.: 14/492,445

(22) Filed: Sep. 22, 2014

(65) Prior Publication Data

US 2015/0075939 A1  Mar. 19, 2015

Related U.S. Application Data

(62) Division of application No. 13/237,555, filed on Sep. 20, 2011, now Pat. No. 8,869,962.

(60) Provisional application No. 61/460,765, filed on Sep. 20, 2010.

(51) Int. Cl.
*F16D 11/10* (2006.01)
*F16D 1/072* (2006.01)
*F16D 11/14* (2006.01)

(52) U.S. Cl.
CPC ............. *F16D 1/072* (2013.01); *F16D 11/10* (2013.01); *F16D 11/14* (2013.01); *Y10T 29/49465* (2015.01); *Y10T 29/49826* (2015.01)

(58) Field of Classification Search
CPC ........... F16D 1/072; F16D 11/10; F16D 11/14
USPC ......... 29/428, 457; 192/69.4, 69, 66.1, 69.9, 192/109 R
See application file for complete search history.

(56) References Cited

U.S. PATENT DOCUMENTS

| | | | |
|---|---|---|---|
| 1,922,929 A | 8/1933 | Chamberlain | |
| 4,433,877 A | 2/1984 | Colanzi | |
| 4,576,503 A | 3/1986 | Orain | |
| 4,674,616 A * | 6/1987 | Mannino, Jr. | ........... F16D 13/64 188/264 D |
| 4,856,633 A | 8/1989 | Specht | |
| 4,893,960 A | 1/1990 | Beier et al. | |
| 5,616,970 A | 4/1997 | Dittrich | |
| 5,740,895 A | 4/1998 | Bigley | |
| 5,782,565 A | 7/1998 | Bertetti et al. | |
| 5,853,250 A | 12/1998 | Krude et al. | |
| 5,984,422 A | 11/1999 | Seifert | |
| 6,042,935 A * | 3/2000 | Krenkel | ................ C04B 35/573 156/329 |
| 6,109,411 A | 8/2000 | Bigley | |
| 6,299,360 B1 | 10/2001 | Dougherty et al. | |
| 6,371,268 B1 | 4/2002 | McMorris et al. | |
| 6,942,082 B1 | 9/2005 | Bunnow et al. | |
| 6,994,136 B2 | 2/2006 | Stanczak | |
| 7,143,883 B2 * | 12/2006 | McCalla | ................. F16D 3/223 192/109 R |

(Continued)

FOREIGN PATENT DOCUMENTS

| | | |
|---|---|---|
| DE | 10 2007 044 702 A1 | 4/2009 |
| DE | 10 2008 011 892 A1 | 9/2009 |

(Continued)

*Primary Examiner* — David J Hlavka (74) *Attorney, Agent, or Firm* — Fitzpatrick, Cella, Harper & Scinto (57) ABSTRACT

A wheel spindle drive element for a wheel disconnect system. The wheel spindle assembling onto an outer diameter of a spindle, displacing material to form a joint with high torque transmission characteristics.

9 Claims, 8 Drawing Sheets

(56) References Cited

U.S. PATENT DOCUMENTS

| | | | |
|---|---|---|---|
| 2004/0216827 A1* | 11/2004 | Stanczak | B60C 23/12 |
| | | | 152/419 |
| 2006/0019757 A1 | 1/2006 | Brunetti et al. | |
| 2006/0019758 A1 | 1/2006 | Loustanau et al. | |
| 2006/0207384 A1 | 9/2006 | Hardy et al. | |
| 2008/0119295 A1 | 5/2008 | Csik | |
| 2008/0182674 A1 | 7/2008 | Brunetti et al. | |
| 2013/0068583 A1* | 3/2013 | Eastman | F16D 1/06 |
| | | | 192/69.42 |

FOREIGN PATENT DOCUMENTS

| | | |
|---|---|---|
| EP | 2 045 476 A2 | 4/2009 |
| GB | 150 887 | 9/1920 |
| GB | 1 405 715 | 9/1975 |
| WO | 98/25772 A1 | 6/1998 |
| WO | 2009 012798 A1 | 1/2009 |

* cited by examiner

FIG. 9 ial, and examples described herein. As one of ordinary skill in the art would appreciate, various changes, modifications, and alterations could be made to the particular embodiments, methods, and examples described herein without departing from the scope of the invention.

WHEEL SPINDLE DRIVE ELEMENT

This application is a division of U.S. patent application Ser. No. 13/237,555, filed Sep. 20, 2011 which claims priority to Provisional Application No. 61/460,765, filed Sep. 20, 2010. The entire disclosures of these prior applications are hereby incorporated by reference herein.

TECHNICAL FIELD

Example aspects herein relate generally to a wheel disconnect system, and, more particularly, to a wheel spindle drive element for a wheel disconnect system.

BACKGROUND

Four wheel drive vehicles often have either front or rear wheels that have selectively driven or non-driven modes that operate by selectively engaging or disengaging the wheels from an associated drive train. In these four wheel drive systems, typically, a transfer case, coupled to the vehicle transmission, is designed such that it can be engaged or disengaged from the drive train. The engagement of the transfer case with the drive train selectively supplies power to a set of wheels. Although efficiencies can be obtained by solely disengaging the transfer case when not needed, it is known in the art that disengaging the wheels from the drive train improves driving efficiencies dramatically.

Where a transfer case is selectively disengaged from the drive train and the associated wheel set remains engaged, losses may result from the wheels "back driving" the system and having to overcome the rotational moment of inertia of half shafts, axle carrier assemblies, pinion shafts, and associated frictional losses in bearings, seals and gears. Therefore, it is desirable to have a wheel disconnect system that works in concert with the transfer case, engaging when the transfer case is engaged and disengaging when the transfer case disengages. It should be recognized that such wheel end disconnect systems may be used on either the front or rear wheels, depending upon which wheel set has the primary drive function.

Prior art wheel end disconnect systems include a spindle supported by bearings in a support coupled to the suspension of the vehicle, having an outer end portion adapted to mount a wheel thereon, and an inner extending portion, disposed towards the center of the vehicle, with splines or other engagement elements formed on an outer diameter of the spindle's inner extending portion. Generally, a wheel spindle drive element is mounted on the inner extending portion of the spindle, the spindle drive element having splines or other engagement elements formed on an inner diameter such that the inner diameter engagement elements of the spindle drive element mate or mesh with the engagement elements on the outer diameter of the spindle inner extending portion. Significantly, the engagement elements on the outer diameter of the spindle inner extending portion and the inner diameter of the spindle drive element are formed on each component prior to assembly. The assembly of the spindle drive element onto the spindle requires clearance between the mating members and closely controlled dimensional characteristics and tolerances on the mating members. Any loss in the axial retention of the assembly could allow a shock load under changing torque input due to the clearance between the mating members. An axial retention mechanism is used to retain the spindle drive element onto the spindle, preventing the spindle drive element from sliding off of the spindle. The retention mechanism may be a number of mechanisms known in the art, including, for example, a nut or a post-assembly outwardly formed flange integral with the spindle. Precise forming of the engagement elements to ensure secure meshing may be difficult, and limits the torque transmission through those elements.

A drive mechanism adapted to rotate under power is mounted adjacent the flange and to the vehicle, with an engaging element or clutch slideably mounted thereon, such that it can be selectively moved into or out of engagement with the spindle drive element, and through the spindle drive element to the wheel. The engaging element or clutch requires an axial force to disengage from the wheel assembly. Generally, a spring is also provided, that urges the engaging clutch back into engagement once axial force has been removed.

BRIEF SUMMARY OF THE INVENTION

An example embodiment herein broadly comprises a wheel spindle drive element for a wheel disconnect system. The wheel spindle drive element pressing onto an outer diameter of a spindle, displacing material by cutting or forming, to produce a joint with high torque transmission characteristics.

In an example embodiment of the invention, cutting elements on an inner diameter of a the wheel spindle drive element cold form grooves into an outer surface of the spindle, moving material into an open volume between the outer diameter of the spindle and a major diameter of the cutting elements.

A method of assembling the spindle drive element to the spindle is presented. Also, a method of determining suitable diameters of the spindle drive element and dimensions of the cutting elements is also presented.

BRIEF DESCRIPTION OF THE DRAWINGS

The nature and mode of operation of the present invention will now be more fully described in the following detailed description of the invention taken with the accompanying drawing figures, in which.

Like drawing numbers appearing in different drawing views identify identical, or functionally similar, structural elements.

DETAILED DESCRIPTION

At the outset, it should be understood that this invention is not limited only to the particular embodiments, methodology, materials and modifications described herein, and as such may, of course, vary. It also should be understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
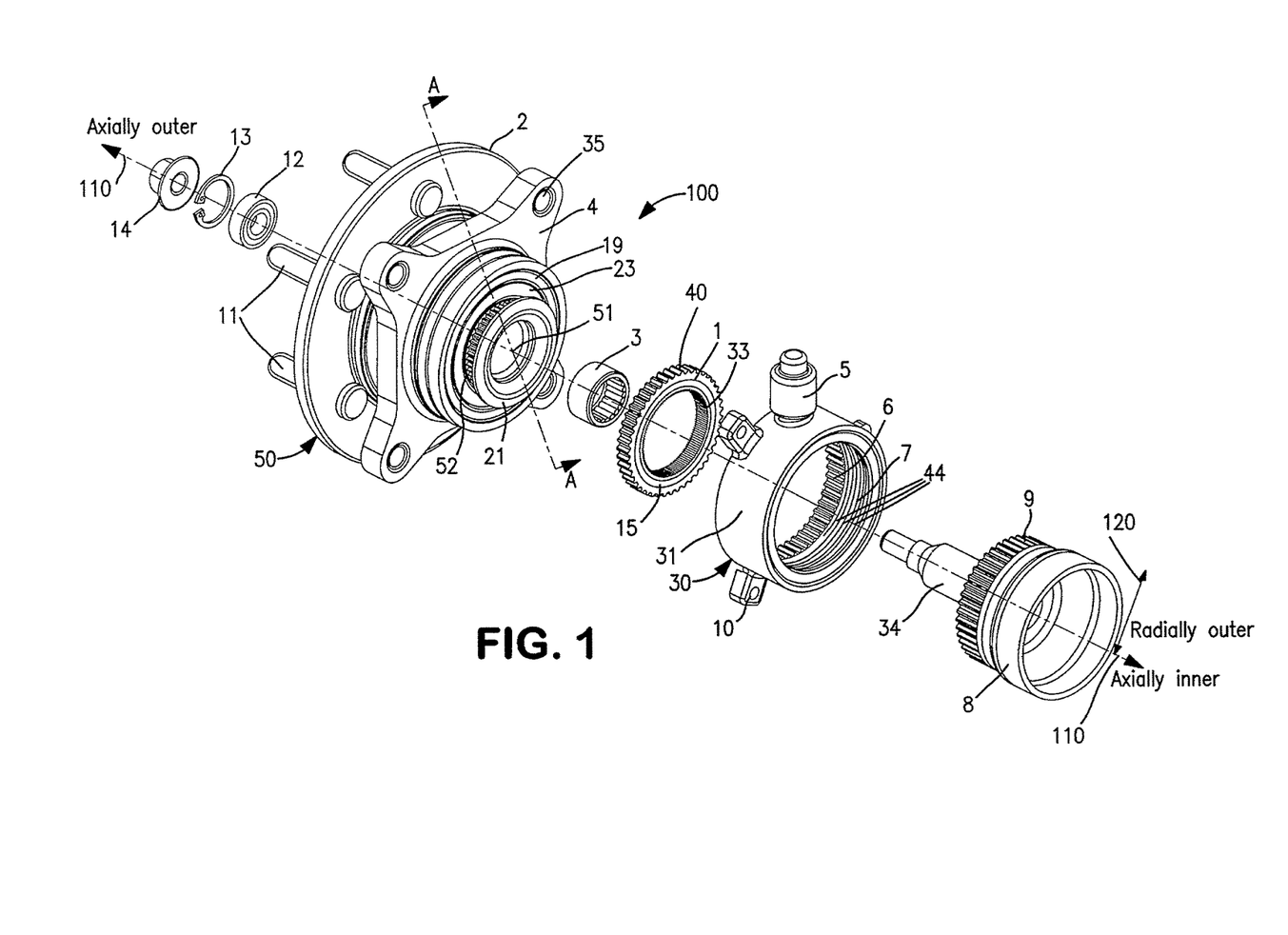
FIG. 1 is an exploded perspective view of a wheel end disconnect system, including a wheel mount assembly, according to an example embodiment herein.
Figure 7:
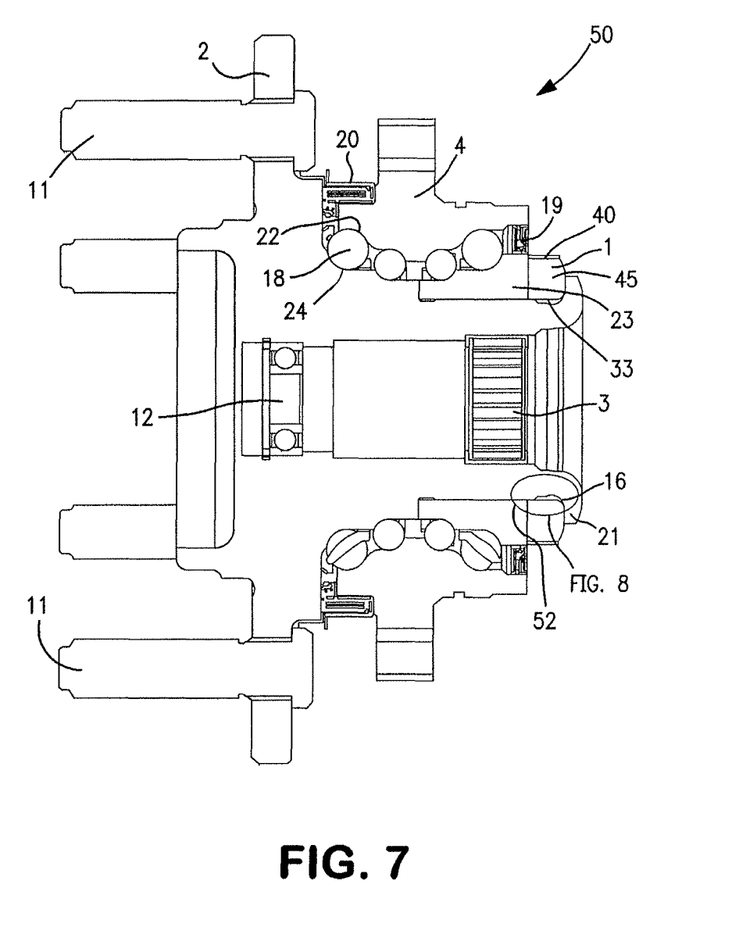
FIG. 7 is a cross sectional perspective view of the wheel mount assembly of FIG. 6, taken along line A-A of FIG. 1.

FIG. 1 shows an exploded view of a wheel end disconnect assembly 100 according to an example embodiment herein. Also shown are reference directional indicators, namely, axial and radial spatial orientations 110 and 120, respectively. Wheel end disconnect assembly 100 comprises wheel mount assembly 50 rotatably mountable to a vehicle, and rotatably mountable on drive axle shaft 34 of drive axle 8, using outer hub shaft support bearing 12 and inner hub shaft support bearing 3 pressable into an inner diameter of spindle 2, and axle drive shaft 34 inserted through the inner diameter of bearings 12 and 3. Referring also to FIG. 7, wheel mount assembly 50, in turn, comprises integrated outer ring 4, having at least one outer race 22 on an inside diameter of outer ring 4, inner ring 23 and spindle 2, including at least one inner race 24 on an outside diameter of inner ring 23 and spindle 2, and rolling elements 18 disposed between the at least one outer race 22 and the at least one inner race 24.

Prior to assembly of wheel mount assembly 50 with drive axle 8, spindle drive element 1 is assembled to a radially outer, axially inner surface 52 of spindle 2 (see FIG. 7). Surface 52 is a cylindrically formed surface. Spindle drive element 1 includes cutting or forming elements 33 on an inner circumferential surface and engagement elements 40 on an outer circumferential surface. Spindle drive element 1 is pressed onto surface 52 of spindle 2, cutting or forming elements 33 displacing material from surface 52, until a predetermined position of spindle drive element 1 is reached. In one example embodiment, shown in FIG. 7, spindle drive element 1 is pressed onto surface 52 of spindle 2 until it contacts an axially inner surface of inner ring 23. Spindle drive element 1 may be retained axially in position by any one or more of a variety of retention elements 21, including, for example: orbital forming and an external nut arrangement. In one example embodiment, retention element 21 is formed against an inner surface of spindle drive element 1 by orbital forming an extended flange portion of spindle 2 in a radially outward direction, such that the flange contacts a side face 15 of spindle drive element 1, thus retaining spindle drive element 1 against bearing inner ring 23 (see FIG. 7). Although a flat side surface 15 is shown on spindle drive element 1 in FIG. 1, slots or pockets may also be included therein to further retain spindle drive element 1 into position, once assembled. These contours, to be described, provide an area where displaced material may enter during orbital forming of flange or retention element 21. In the example embodiment shown in FIG. 1, retention element 21 is shown in an already radially outwardly formed condition. It should be understood that the extended flange portion of spindle 2 will be in a generally cylindrical form prior to orbital forming the flange portion radially outwardly.

Engagement interlock selector assembly 30 can be mounted to a suspension member or knuckle (not shown) of a motor vehicle (not shown) and drive axle 8 can be inserted through an internal diameter of interlock selector assembly 30. C-clip 13 and nut 14 are then assembled onto drive axle shaft 34, and tightened against an outer axial face (not shown) of outer hub shaft support bearing 12. Engagement interlock selector assembly 30, in turn, comprises selector assembly housing 31, actuator 5 assembled through a hole (not shown) in housing 31, an engagement selector ring (also referred to as an interlock mechanism) 6 with inner engagement elements 44, inserted into housing 31, and spring 7 inserted in an opposite end of housing 31 from that in which selector ring 6 is inserted. In one embodiment, actuator 5 is a solenoid, although the invention is not limited only thereto. Also shown in FIG. 1 is bearing seal 19, preventing ingress of contaminants into wheel mount assembly 50. Although a mechanical wheel disconnect system is shown, any other suitable wheel disconnect system is contemplated for use in conjunction with the example embodiments herein.

Figure 2:
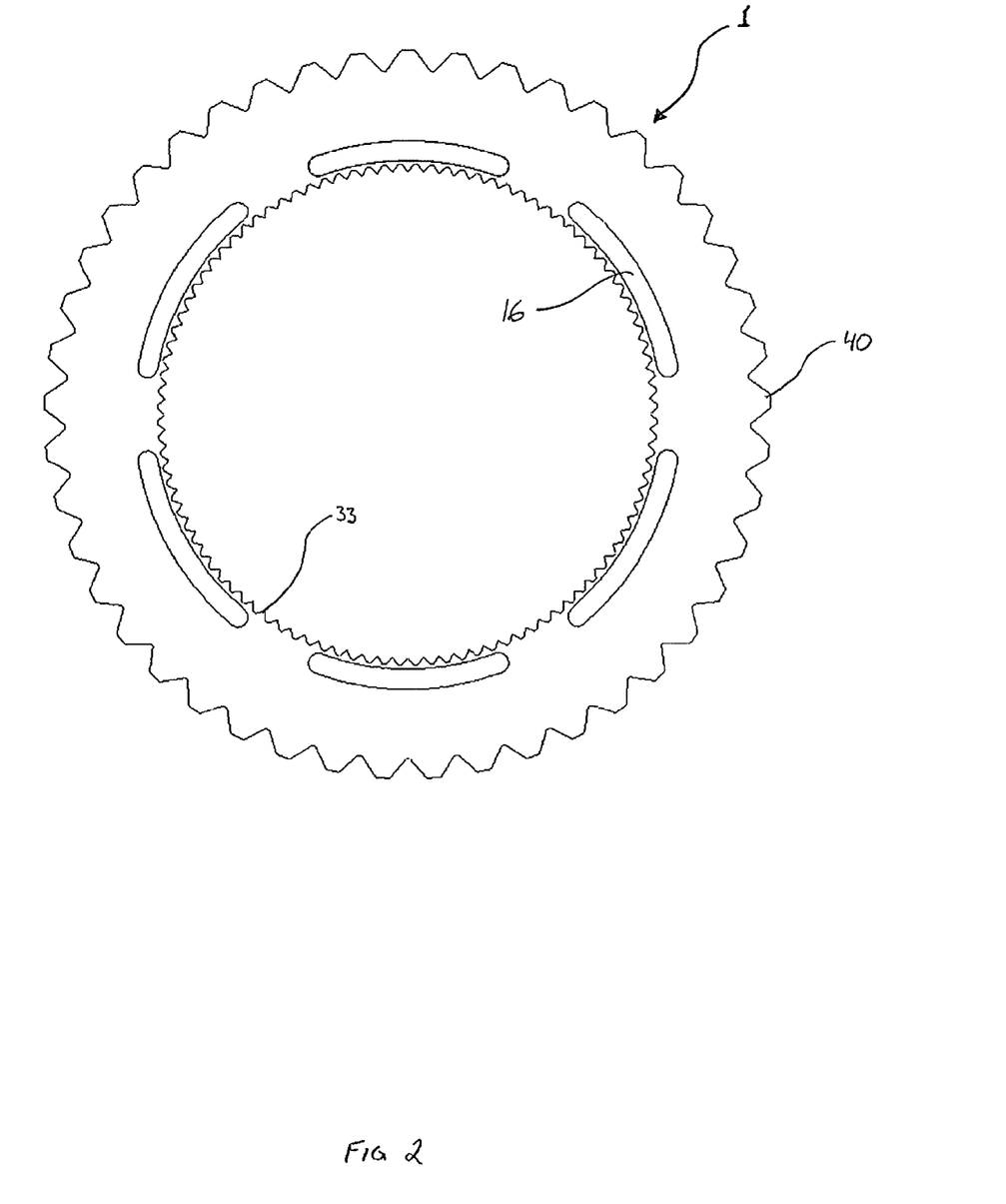
FIG. 2 is a side view of a spindle drive element, according to an example embodiment herein.
Figure 3:
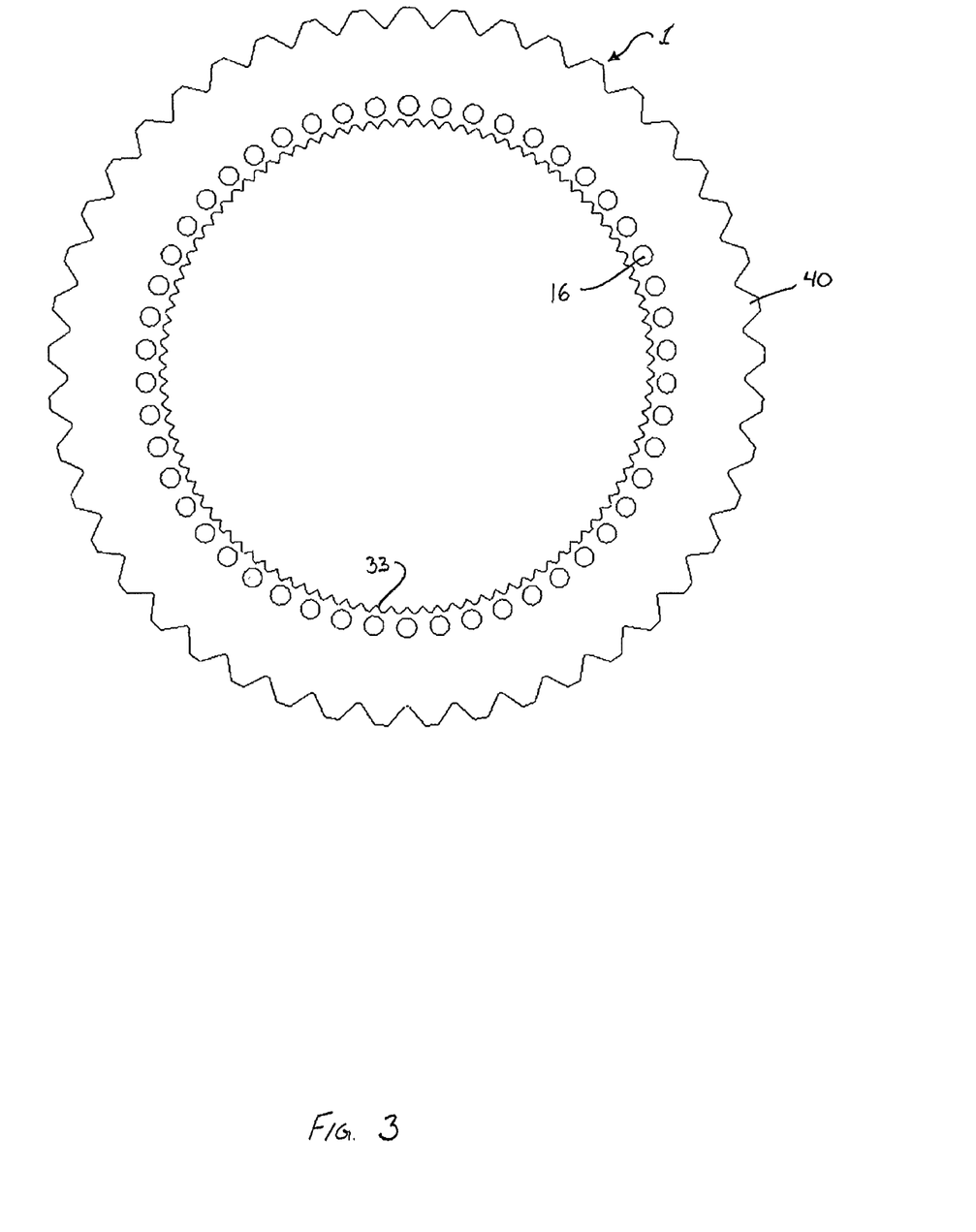
FIG. 3 is a side view of a spindle drive element, according to a further example embodiment herein.
Figure 4:
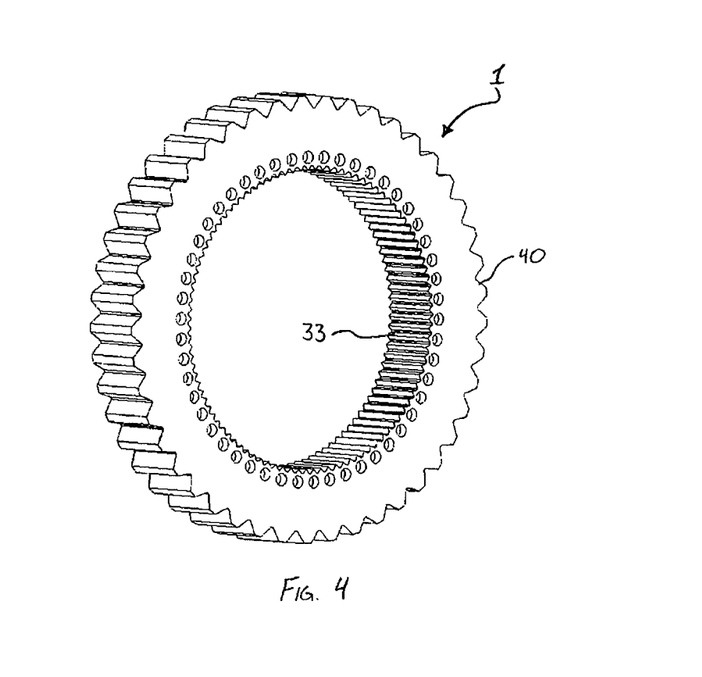
FIG. 4 is a perspective view of the spindle drive element of FIG. 3.
Figure 5:
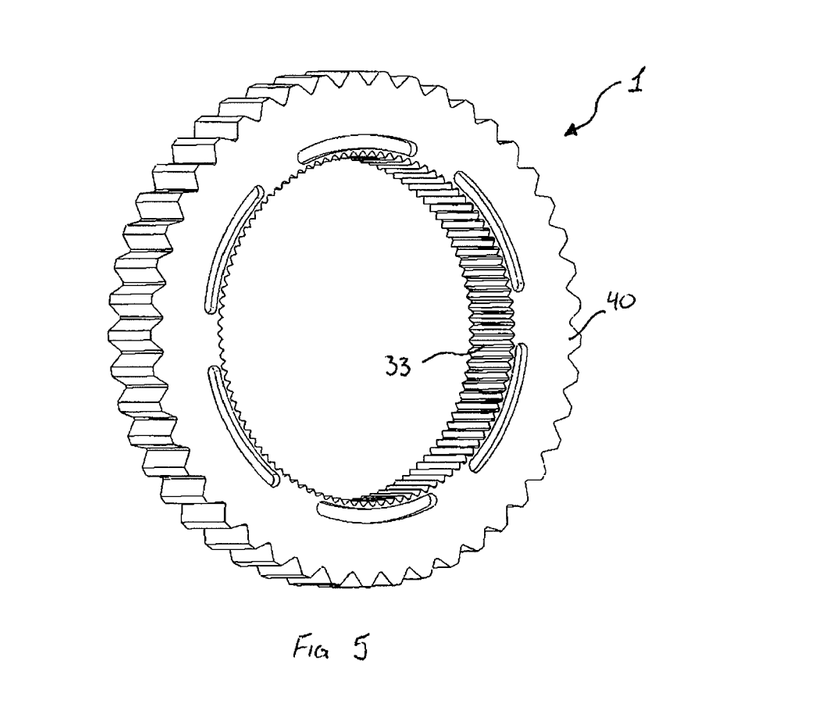
FIG. 5 is a perspective view of the spindle drive element of FIG. 2.

FIGS. 2 to 5 show example embodiments of spindle drive element 1. FIG. 2 shows a side view of spindle drive element 1 according to one example embodiment herein. Spindle drive element 1 includes engagement elements 40 on an outer circumferential surface, cutting or forming elements 33 on an inner circumferential surface and retention contours 16. In this example embodiment, cutting or forming elements 33 are serrations and retention contours 16 are slots formed as either depressions or through holes in spindle drive element 1 proximate cutting or forming elements 33. FIG. 3 shows a side view of spindle drive element 1 according to another example embodiment wherein retention contours 16 are substantially rounded depressions or through holes proximate cutting or forming elements 33. FIG. 4 and FIG. 5 are perspective views of the embodiments of the spindle drive element 1 from FIGS. 3 and 2, respectively, also showing width W of spindle drive element 1.

Figure 6:
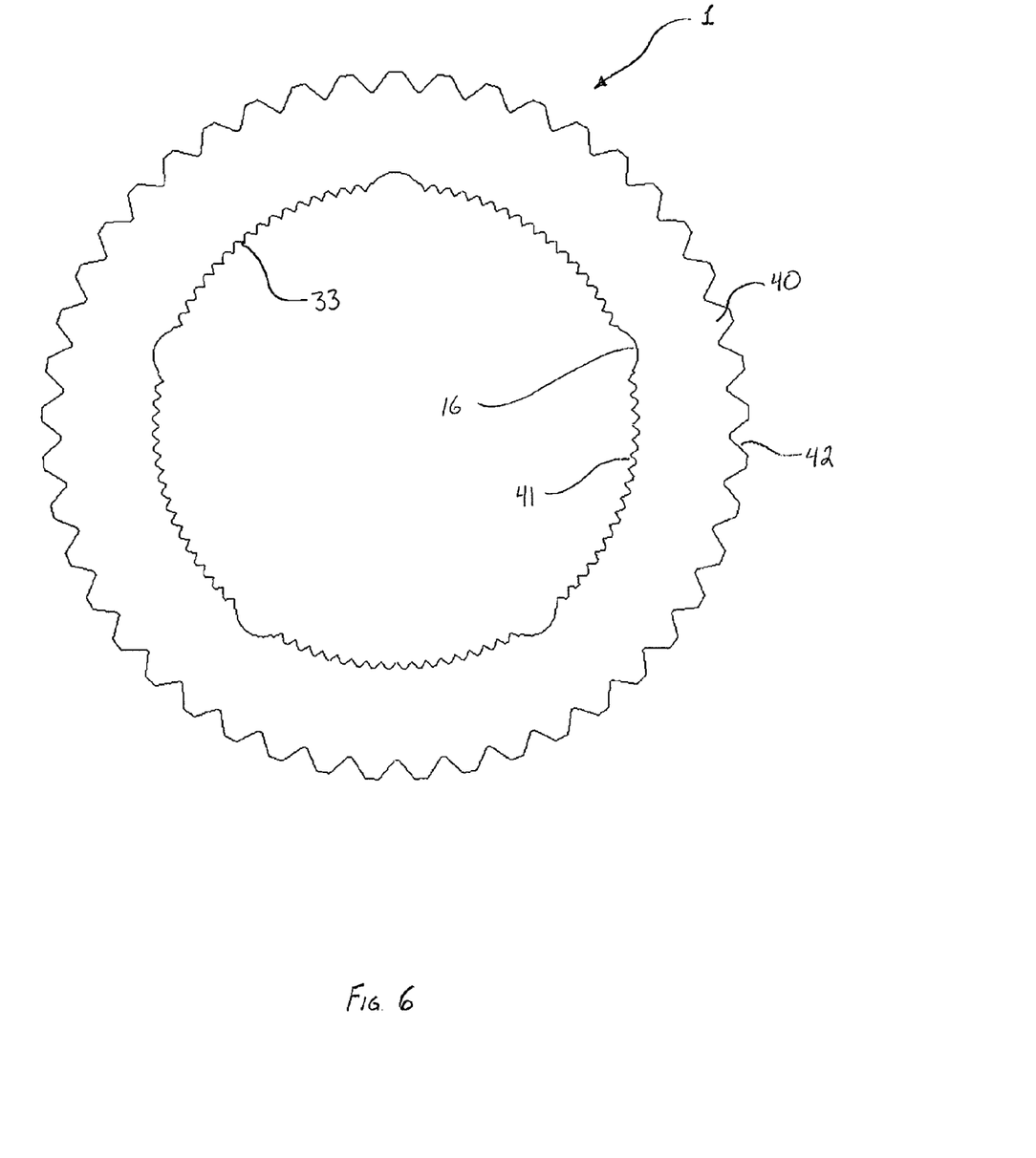
FIG. 6 is a side view of a spindle drive element, according to one example embodiment herein.

FIG. 6 shows a side view of a further embodiment of spindle drive element 1. In this embodiment retention contours 16 are shown as key pockets, extending from an inner radial surface 41 towards an outer radial surface 42 of spindle drive element 1. Although retention contours 16 are shown as rounded depressions, any shape of contour is contemplated for the present embodiment.

FIG. 7 is a cross sectional view of wheel mount assembly 50 of wheel disconnect system 100 of FIG. 1, taken along line A-A of FIG. 1. Wheel mount assembly 50 comprises integrated outer ring 4, spindle 2, rolling elements 18, bearing inner ring 23, outer bearing seal 20, bearing seal 19 and wheel bolts 11. In this example embodiment, spindle drive element 1 abuts bearing inner ring 23, and a protruding hub flange is formed radially outwardly to form retention element 21. In the embodiment shown, retention contours 16, corresponding to the contours shown in FIGS. 2 and 5, in side face 15 of spindle drive element 1 are shown partially filled with material displaced during the forming operation of retention element 21. Cutting or forming elements 33 are shown having already cut into or displaced material from surface 52 of spindle 2. Inner hub shaft support bearing 3 and outer hub shaft support bearing 12 are pressed into an inner diameter of spindle 2. Also shown are engagement elements 40.

Figure 8:
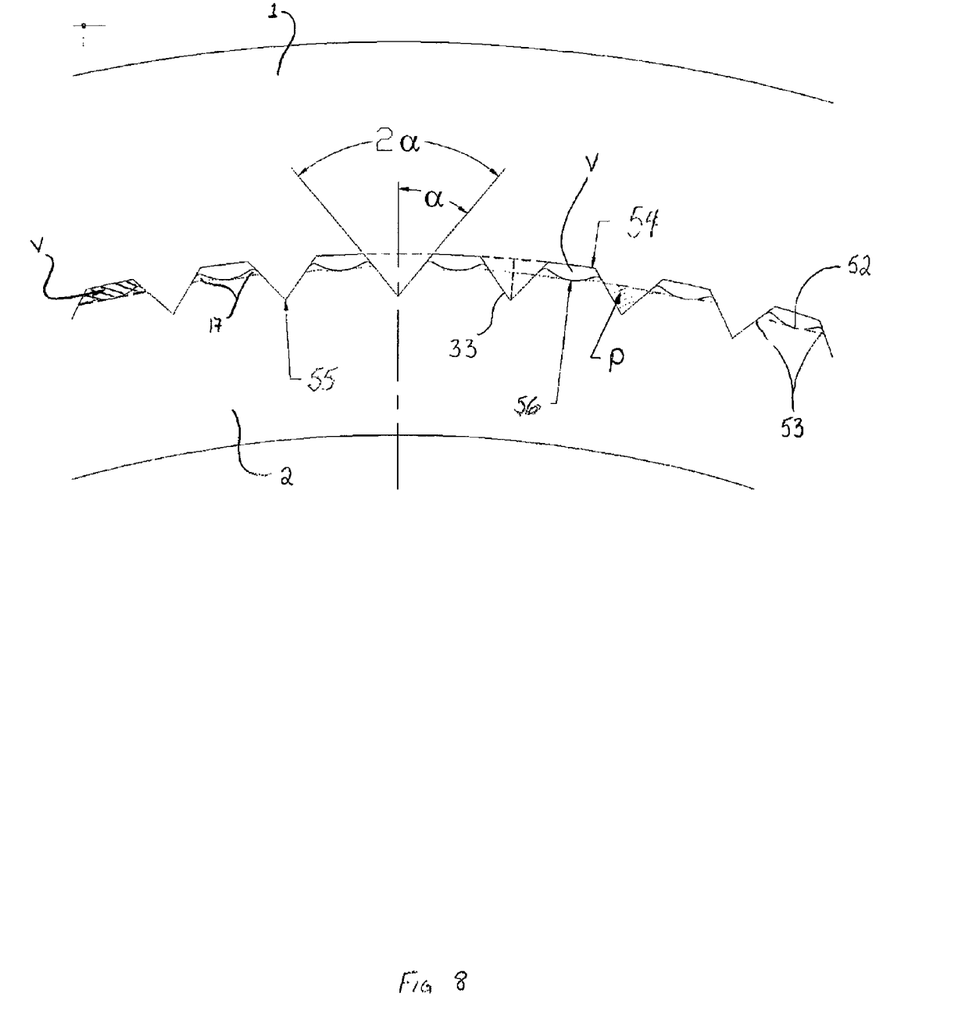
FIG. 8 is a enlarged side view of the interface of a spindle drive element and a spindle, according to one example embodiment herein.

FIG. 8 shows an enlarged side view of interface 53 of a spindle drive element 1 and a spindle 2, circled in FIG. 7, according to one example embodiment herein. Prior to assembly of spindle drive element 1 onto spindle 2, surface 52 of spindle 2 is a generally cylindrical surface. During assembly, cutting or forming elements 33, shown as serrations, cold form surface 52, displacing material 17, the material generally moving to an open volume V, in this example defined as the interstitial volume available between the major diameter 54 of cutting or forming elements 33 and the outer diameter 56 of spindle 2. In order to minimize or avoid excessive radial stresses that may damage the structural integrity of spindle drive element 1 or spindle 2, the volume V, in one example is large enough such that all displaced material 17 of spindle 2 can fit into the volume V without filling an entire space. The volume of displaced material 17, may generally be defined as the volume taken up by cutting or forming element 33 below the outer diameter 56 of spindle 2, shown as P in FIG. 8. The major diameter 54 and minor diameter 55 of cutting or forming elements 33, can be selected by considering that the shape and form of cutting or forming elements 33 may vary from application to application. For example, in one embodiment wherein cutting or forming elements 33 are serrations, the shape and volume of the serrations can be defined by an angle α. In one example, a ratio is taken of the expected volume of displaced material 17 over the open volume V, wherein the ratio is in the range of greater than 0 and less than 1. Through the use of an iterative calculation, an example of which is shown below, and testing, a suitable volume and suitable diameters are determined for a particular application; balancing proper fill for maximum torque transmission and acceptable forming depth of cutting or forming element 33 in spindle 2.

Figure 9:
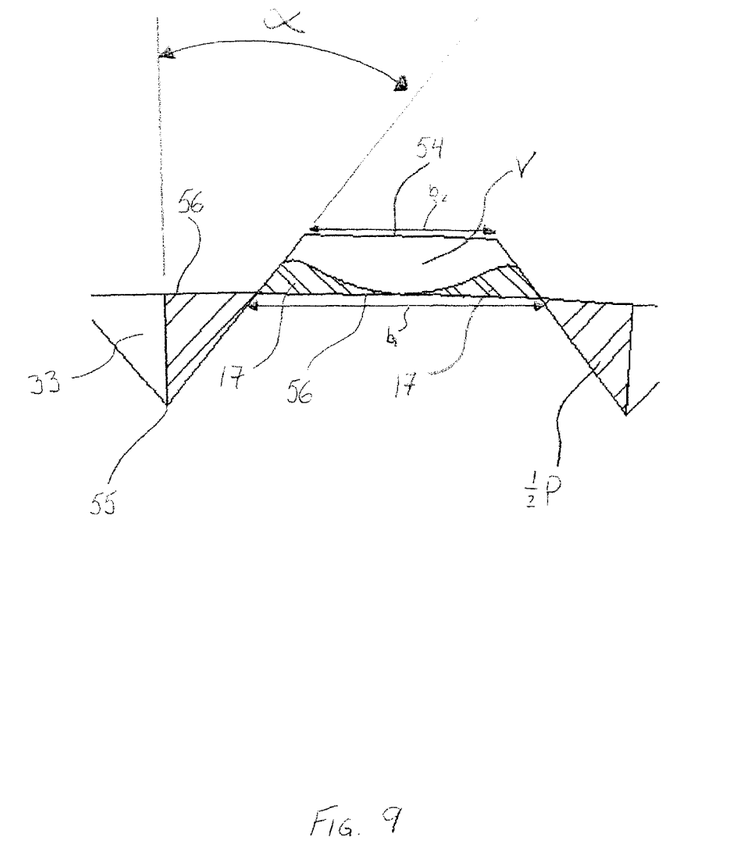
FIG. 9 is a further enlarged view of the interface of a spindle drive element and a spindle of FIG. 8.

FIG. 9 shows cutting element 33 as a triangular serration. Approximately one half of volume P of cutting element 33, in this example, is displaced from spindle 2, which can move into interstitial space V, shown as displaced material 17. The volume of cutting element 33 formed as a serration in this example, is therefore approximately equal to volume of displaced material 17 and can be calculated as, approximately:

$$\text{Volume}_{17} \sim \text{Volume}_P = V_P = \text{Area of cutting element below outer diameter of spindle ("}P\text{")} \times \text{Width of Spindle Drive Element ("}W\text{")}$$

In this example, cutting element 33 is a triangular serration, therefore, approximate volume is calculated as:

$$V_P = (\tfrac{1}{2} \text{base} \times \text{height}) \times W$$

where: base=b=width of serration 33 at a cross section taken at a point adjacent the outer diameter of spindle 56
height=h=outer diameter of spindle 56−minor diameter of serration 55 therefore, base (b) can be calculated as, approximately:

$$b = h \tan \alpha$$

Interstitial space, V, in this example, can be approximated as:

$$\text{Volume}_V = V_V = \text{height} \times [(b_1 + b_2)/2] \times W$$

Therefore, the initial ratio, in this example is:

$$0 < V_P/V_V < 1$$

As an initial iteration, a ratio equal to ½ can be taken, one may solve for an initial minor diameter 55 and major diameter 54 of cutting element 33. Once testing is performed, to determine torque transmission and assembly characteristics, further calculations may be needed to improve results.

By using such a cold forming or cutting assembly method, a stronger interface 53 can be created between the mating elements; spindle drive element 1 and spindle 2, allowing for a greater transmission of torque. Additionally, zero clearance between the mating elements and a cutting or forming assembly method can allow for expanded tolerance zones on each of the mating components at the interface surfaces, namely, inner surface 41 of spindle drive element 1 (see FIG. 6) and outer surface 56 of spindle 2 (see FIG. 8). Expanded tolerance zones, in turn, can ease manufacturing complexity. Also, a zero clearance between mating members, spindle 2 and spindle drive element 1, can produce a stronger torque transmission joint under variable magnitude and direction of loading.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LIST OF REFERENCE SYMBOLS

1 Spindle Drive Element
2 Spindle
3 Inner Hub Shaft Support Bearing
4 Integrated Outer Ring
5 Actuator
6 Engagement Selector Ring or Interlock Mechanism
7 Spring
8 Drive Axle
11 Wheel Bolts
12 Outer Hub Shaft Support Bearing
13 C-Clip
14 Nut
15 Spindle Drive Element Inner Side Surface
16 Retention Contours
17 Spindle Displaced Material
18 Rolling Elements
19 Bearing Seal
20 Outer Bearing Seal
21 Retention Element
22 Outer Race
23 Bearing Inner Ring
24 Inner Race
30 Engagement Interlock Selector Assembly
31 Selector Assembly Housing
33 Cutting or Forming Elements
34 Drive Axle Shaft
40 Spindle Drive Element Engagement Elements
41 Inner Radial Surface
42 Outer Radial Surface
50 Wheel Mount Assembly
52 Spindle Mount Surface
53 Spindle/Spindle Drive Element Interface
54 Major Diameter of Cutting Element
55 Minor Diameter of Cutting Element
56 Spindle Mounting Surface Outer Diameter
100 Wheel End Disconnect System or Assembly
110 Axial Orientation
120 Radial Orientation
P Volume of cutting element
V Open volume between spindle and major diameter of cutting element

What I claim is:
1. A wheel spindle drive element assembly, comprising:
a spindle; and
a wheel spindle drive element,
wherein said wheel spindle drive element includes engagement elements disposed on an outer circumferential surface thereof, and cutting or forming elements disposed on an inner circumferential surface thereof, wherein said cutting or forming elements are configured to displace material from an outer surface of said spindle, and wherein said wheel spindle drive element further includes a cavity disposed proximate to one of said cutting or forming elements, the cavity being configured to retain the material displaced from the outer surface of said spindle.

2. The wheel spindle drive element assembly of claim 1, wherein said cutting or forming elements are serrations.

3. The wheel spindle drive element assembly of claim 1, wherein the cavity is a through hole formed through a side face of the wheel spindle drive element, proximate to the respective cutting or forming element.

4. The wheel spindle drive element assembly of claim 1, wherein the cavity is a slot formed in a side face of the wheel spindle drive element, proximate to the respective cutting or forming element.

5. The wheel spindle drive element assembly of claim 1, wherein the cavity is a contour formed on the inner circumferential surface of the wheel spindle drive element, proximate to the respective cutting or forming element.

6. The wheel spindle drive element assembly of claim 1, wherein said wheel spindle drive element includes a plurality of cavities disposed proximate to said cutting or forming elements.

7. The wheel spindle drive element assembly of claim 6, wherein the cavities are through holes formed through a side face of the wheel spindle drive element, proximate said cutting or forming elements.

8. The wheel spindle drive element assembly of claim 6, wherein the cavities are shallow engagement slots formed in a side face of the wheel spindle drive element, proximate said cutting or forming elements.

9. The wheel spindle drive element assembly of claim 6, wherein the cavities are contours formed on the inner circumferential surface of the wheel spindle drive element, proximate to said cutting or forming elements.

* * * * *